Figure 1:
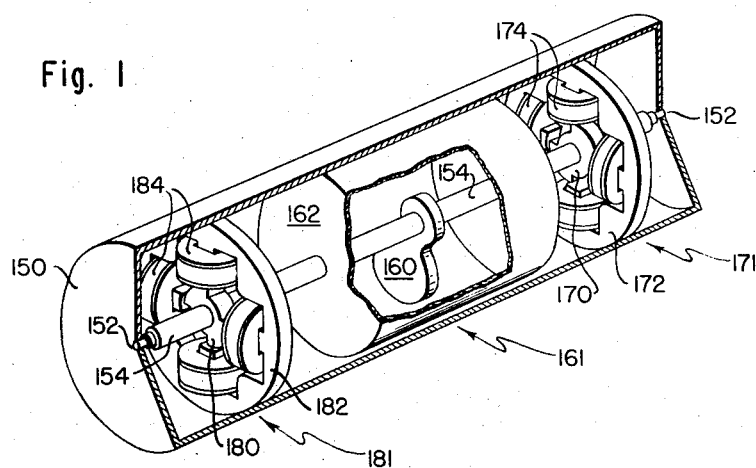

Sept. 23, 1958     C. S. DRAPER ET AL     2,853,287
MOTION-MEASURING SYSTEM
Filed March 13, 1952     3 Sheets-Sheet 1

INVENTORS
CHARLES S. DRAPER
CLAUDE L. EMMERICH
BY
ATTORNEYS

Sept. 23, 1958     C. S. DRAPER ET AL     2,853,287
MOTION-MEASURING SYSTEM
Filed March 13, 1952     3 Sheets-Sheet 2

$\omega_3 = \omega_1(1+G_1)$ $\omega_4 = \dfrac{\omega_1}{1+\omega_1 G_2}$ $\omega_5 = \dfrac{\omega_0^2}{\omega_4}$

INVENTORS
CHARLES S. DRAPER
CLAUDE L. EMMERICH
BY
ATTORNEYS

Sept. 23, 1958   C. S. DRAPER ET AL   2,853,287
MOTION-MEASURING SYSTEM
Filed March 13, 1952   3 Sheets-Sheet 3
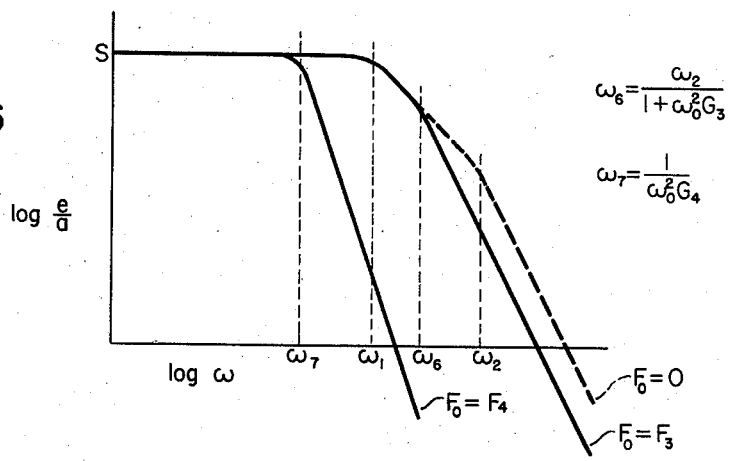
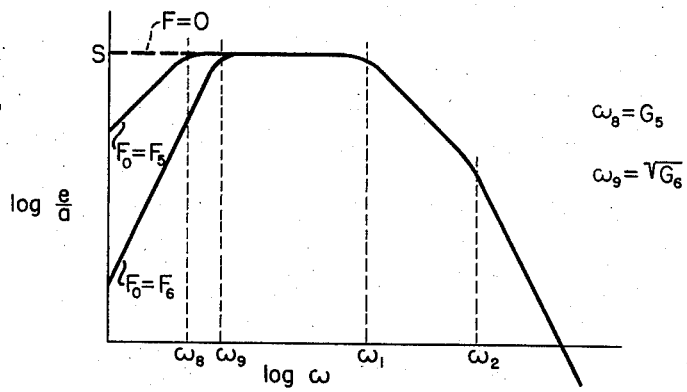
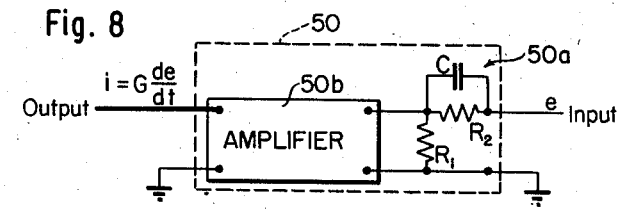
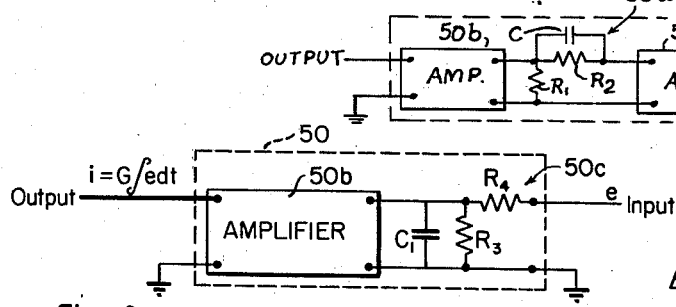
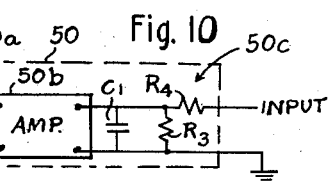
*INVENTORS*
CHARLES S. DRAPER
CLAUDE L. EMMERICH
BY
*ATTORNEYS*

United States Patent Office 2,853,287
Patented Sept. 23, 1958

2,853,287

MOTION-MEASURING SYSTEM

Charles S. Draper, Newton, and Claude L. Emmerich, Cambridge, Mass., assignors, by mesne assignments, to Research Corporation, New York, N. Y., a corporation of New York Application March 13, 1952, Serial No. 276,414

6 Claims. (Cl. 264—1)

The present invention relates to acceleration-detecting apparatus and more particularly to a means for making the output of an acceleration-detecting device be a desired function of its input.

In such apparatus as gyrocompasses and navigational and guidance systems, it is common to use inertial-element acceleration detectors for certain purposes. For example, in a gyrocompass, pendulums are used to orient the direction-sensitive element to the horizontal; in a guidance system like that described in the copending application of Woodbury, Hutzenlaub and Atwood Ser. No. 304,386 filed August 14, 1952 acceleration-sensitive devices are used to detect deviations of the vehicle from its course. Conventionally, such acceleration detectors consist of a mass element movable in the direction along which the acceleration is to be measured, and some means for resisting deflections of the mass by a force proportional to the deflection. The deflection is measured to determine acceleration.

Such devices pick up spurious accelerations. For example, when a pendulum, which is supposed to be sensitive to horizontal accelerations only, is widely deflected, it may be affected by vertical accelerations as well. Another problem is that the characteristic response time of such a device as a pendulum or spring-mass combination is a function of its physical dimensions so that it may be impracticable or very difficult to vary the response time as desired. Thus, for example, one is forced to resort to a mercury-ballistic pendulum to obtain a long-period pendulum that is not several hundred yards long.

It is, therefore, one object of the present invention to make possible a wide variation in the characteristics of an acceleration-sensitive device by simply varying electrical parameters.

Since in certain regions of the frequency response of an acceleration-sensitive device, the device is effectively sensitive to velocity or position, it is another object of the present invention to provide means for converting an acceleration-sensitive device to a velocity or position-sensitive device.

In furtherance of these and other objects as will hereinafter appear, a principal feature of the present invention is the provision of signal-generating means to detect accurately and measure motion of the inertial element in the measuring device.

Another feature of the present invention is the provision of torque or force-generating means responsive to a measurable electric input to introduce measurable forces on the inertial element.

A further feature of the present invention is an electromechanical feedback around the inertial element, by using the output from the signal-generating means to activate the force-generating means so as to act mechanically on the inertial element. This differs significantly from merely performing electrical operations on the signal output, as will be explained below.

In brief, then, the present invention consists of an acceleration-sensitive device including an inertial element and means for resisting deflections of said element by a linearly-varying force, signal-generating means for measuring deflections of the inertial element, force-generating means for producing forces on the inertial element and various electrical components for adapting the signal output to activate the force-generating means.

Figure 2:
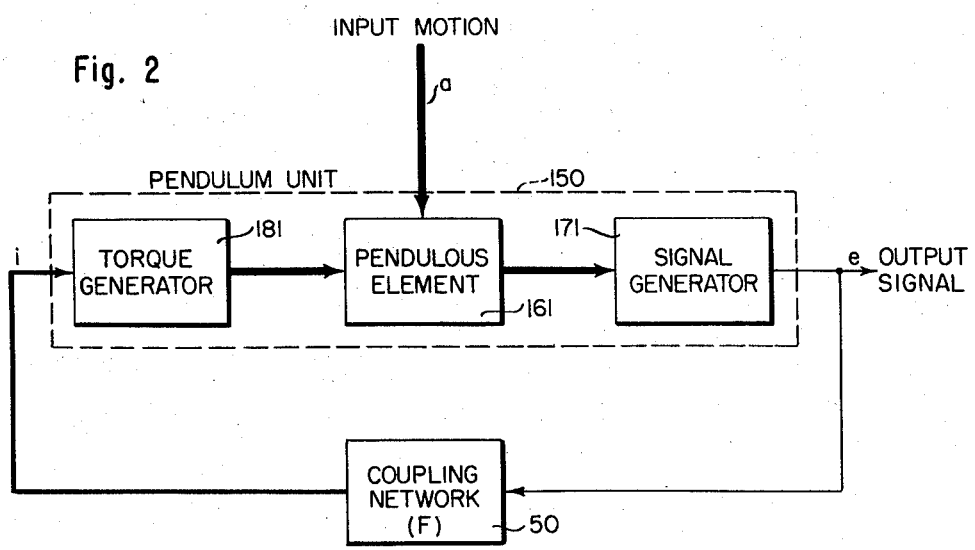

The features described above and others will appear from the accompanying drawings in which Fig. 1 shows in cutaway view a preferred form of pendulum accelerometer unit; Fig. 2 is a block diagram of the present invention; Figs. 3, 4, 5, 6 and 7 are graphs of frequency response curves for an acceleration-sensitive device modified according to the present invention; Figs. 8 and 9 show typical differentiating and integrating circuits, respectively, suitable for use with the present invention; and Fig. 10 is a diagram of a combined integrating and differentiating circuit.

A preferred form of acceleration-sensitive unit is shown in Fig. 1. The unit is contained in the cylindrical case 150, and consists of three sections, an inertial element 161 with associated damping, the signal generator 171 and the torque generator 181. Torques are summed about the shaft 154 which is mounted in suitable bearings as shown at 152. (For the sake of accuracy it is desirable to have bearing friction as low as possible.) The pendulous mass is shown at 160 rigidly attached to the shaft 154; it should be noted that it need be of no particular shape so long as there is a moment distance between its center of mass and the center of rotation of the shaft 154. It is desirable to damp the pendulum, for reasons which are discussed more fully below. Therefore, surrounding the pendulous mass and rigidly attached to the shaft 154 is the float 162. Thus, when the shaft 154 is rotated, the float is also. The float is of dimensions such that the clearance between it and the case 150 is very small, of the order of a few thousandths of an inch. The case is filled with a high-density, high viscosity fluid, which supplies the damping. The fluid fills the space between the float and the case and therefore gives rise to a viscous shear force when the float (i. e., the shaft 154) is rotated. Furthermore, because the float 162 is totally immersed in the fluid there is a buoyant force exerted on it which counterbalances the weight, thereby largely removing the weight force from the bearings 152. In practice, the weight force on the bearings may be about a kilogram; the relation of float and buoying fluid may be arranged to reduce this force to one gram. The fluid serves another purpose; if the pendulum is to be mounted in a vehicle, such as an aircraft, as will usually be the case, the unit will be subjected to jolts and sudden accelerations which would cause sizable reaction forces on the bearings 152. The fluid acts as a cushion, transmitting these reaction forces to the case 150 directly, bypassing the bearings. This permits the more delicate types of low-friction bearings to be used.

The second section of the pendulum unit comprises a signal generator 171, preferably of the type described in U. S. Patent No. 2,488,734 of Mueller, November 22, 1949. Such a signal generator comprises a rotor, shown at 170, rigidly attached to the shaft 154, and a stator 172 mounted on the case 150. Windings 174 are provided on the stator. A reference voltage applied to the windings produces an output voltage whose magnitude is proportional to the angle between the rotor and its neutral position with respect to the stator, as described in the above-mentioned patent. Thus, an electrical measure of the pendulum deflection is provided.

The third section of the pendulum unit is the torque generator 181 which is preferably of the type described in the above mentioned Mueller patent. Its physical configuration is the same as that of the signal generator; there is a rotor 180 mounted on the shaft 154 and a stator 182 attached to the case 150 with stator windings 184. The torque generator produces a torque on the shaft 154 which is proportional to the current input to the stator windings and substantially independent of the relative position of the rotor and stator.

It is to be understood that the preferred type of pendulum unit is exactly the same as that described in the copending application of Jarosh and Picardi, Serial No. 222,792, filed April 25, 1951, now Patent No. 2,802,956, dated August 13, 1957, and the above brief description may be supplemented by a reference thereto. Fig. 2 shows the electromechanical feedback taught by the present invention. (Heavy lines indicate mechanical connections; medium lines show power-level connections; light lines show signal-level connections.) The pendulum unit 150 is indicated in block form, with its torque generator 181, pendulous element 161 and signal generator 171. The pendulum unit output is indicated by an output voltage $e$ from the signal generator 171. This output voltage is passed to a coupling network 50 through which it is fed back as an input to the torque generator 181. The coupling network 50 is indicated as having a transfer function F, that is, $i$, the input to the pendulum unit is a function $F(e)$ of the output voltage $e$ of the pendulum unit 150. The coupling network and the function F may take varying forms as will be discussed more fully below.

Generally, however, the coupling network 50 will include a pre-amplifier to raise the signal $e$ to a more manageable power level (as indicated by the medium-weight output arrow). The network may also include means for transferring a modulation in the modulated signal from the signal generator 171 to another carrier frequency or to direct current. A current generator may be used to provide a suitable input to the torque generator. These circuits are ordinary types which will be familiar to one skilled in the art and are therefore not described in detail.

It should be noted that the electromechanical feedback shown in Fig. 2 differs fundamentally from any electrical operation performed on the signal $e$ after it leaves the pendulum unit 150. There are two reasons for this. First, activating the torque generator 181 causes a fundamental change in the input data to the system. The input to the system is horizontal acceleration which causes inertia reaction torques on the pendulous elements 161. (The gravity acceleration force resists deflections due to these accelerations, producing a linear restoring force.) The pendulum is essentially a means for determining the amounts of these torques. The only measure of them is the deflection of the pendulous element which is the data to the system which generates the output voltage $e$. Activating the torque generator 181 changes the pendulum deflection and therefore is equivalent to adding or subtracting from the input data, acceleration. By this means, spurious accelerations may be eliminated. For example, in marine applications the pendulum may be corrected so that it is sensitive only to an acceleration whose period is long compared to the roll and pitch of the vessel. Similarly, the angle of swing of the pendulum may be reduced so it never will pick up appreciable vertical accelerations. A later electrical network would not so modify the input data.

Second, the electromechanical feedback system shown in Fig. 2 changes the performance function of the pendulum unit. The pendulum unit converts an acceleration $a$ into an output voltage $e$, relating them by a function which may be called the performance function of the pendulum unit. If electrical operations were performed on the output voltage $e$ only, the over-all performance function would be the performance function of the pendulum unit plus the performance function of the succeeding electrical network. Then, if the pendulum unit has a resonant frequency, or an attenuated response in a certain frequency range, these characteristics will be passed on through the electrical networks. (The electrical networks can compensate for the pendulum response only up to the point where "noise," i. e. pendulum uncertainty, becomes an appreciable part of the pendulum output.) An electromechanical feedback such as that shown in Fig. 2 changes the performance function of the pendulum unit itself, that is, it changes the relation of $e$ to $a$. It thereby differs from acting upon the pendulum unit output by a later electrical network.

Figure 3:
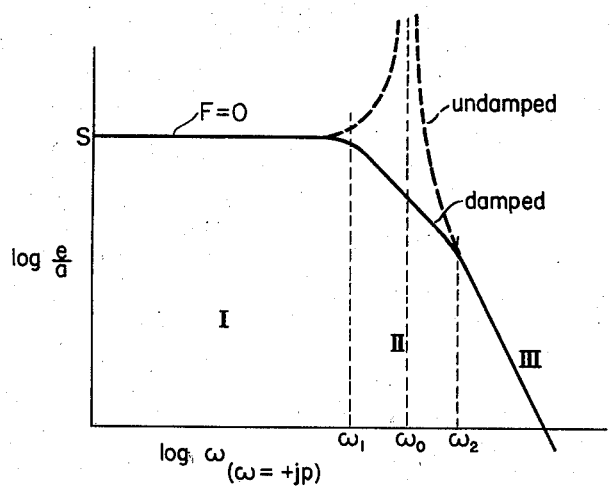

It will now be shown how the performance function of the pendulum unit 150 may be modified as desired, by changing the characteristics of the coupling network 50. Fig. 3 is a graph of the logarithm of the performance function $$\frac{e}{a}$$

that is, the output voltage $e$ (or output angle) divided by the input acceleration $a$. The frequency is plotted as $\omega$, that is, radians per second and not cycles per second. Fig. 3 shows the performance functions for an undamped pendulum and for a damped pendulum, like that of Fig. 1. The differential equation of motion for an undamped pendulum is:

(1) $\quad Ip^2\theta + mgl\theta = mla$ where I is the moment of inertia, $p$ is the differential operator $$\left(\frac{d}{dt}\right)$$

$\theta$ is the angular deflection of the pendulous element which is a function of time, $l$ is the pivot-center of mass separation, $g$ is gravity and $a$ is the forcing acceleration. Equation 1 is the equation of an undamped pendulum. Then Equation 1 may be rewritten as below:

(2) $\quad \dfrac{e}{a} = \dfrac{S}{1 - \dfrac{\omega^2}{\omega_0^2}}$ $p$ may be taken as $+j\omega$, because a differentiation of a sine or cosine function involves multiplying or dividing by the frequency, and shifting the phase by 90°. $e$ is the output voltage, $a$ is the input acceleration which has a frequency $\omega$, $\omega_0$ is the natural frequency of the pendulum, that is $$\sqrt{\frac{mgl}{I}}$$

and S is the acceleration-voltage sensitivity of the pendulum unit. This leads to the performance function indicated by the dotted line in Fig. 3. When $\omega$ is small in comparison with $\omega_0$ the performance function is simply S, that is, the ratio between the output voltage and the input acceleration when the acceleration has zero frequency. This is the region indicated as I in Fig. 3. As $\omega$ becomes commensurate with $\omega_0$, (region II) the denominator of the right hand side of Equation 2 becomes smaller and smaller, causing the ratio of output to input to increase, until $\omega$ equals $\omega_0$ when the response is theoretically infinite. As $\omega$ becomes greater than $\omega_0$, (region III) the right hand side Equation 2 becomes negative and decreases in absolute value. When $\omega$ is much greater than $\omega_0$ the 1 becomes negligible and the ratio of output to input decreases as the square of the frequency, that is, with slope of $-2$ in Fig. 3. This is the high frequency response of the pendulum unit.

Fig. 3 also shows the performance function for the damped pendulum of Fig. 1. The damping imposed on the pendulous element by the apparatus of Fig. 1 is preferably made considerably larger than critical damping for the system (i. e., that value of damping which will most quickly eliminate oscillations of the pendulous element).

The differential equation of motion for the damped, forced pendulous element is given in Equation 3:

(3) $$Ip^2\theta + cp\theta + mgl\theta = mla$$

where $c$ is the damping coefficient in torque units per radian per second. Since $e$ is proportional to $\theta$, Equation 3 may be rewritten as a performance function:

(4) $$\frac{e}{a} = \frac{S}{1 - \frac{\omega^2}{\omega_0^2} + j\frac{c}{mgl}\omega}$$

where $\omega = +jp$. This is the equation which is plotted as the full line in Fig. 3. There are three regions to the curve. First, where $\omega$ is small (region I) the $$\frac{1}{\omega_0^2} \text{ and } \frac{c}{mgl}$$

terms are negligible in comparison to the 1 and the response is simply $S$. If the value of damping is large, as has been described above, as the frequency is increased, region II occurs where the $\omega^2$ term is still negligibly small, but the $\omega$ term is commensurate with 1. This is the range indicated in Fig. 3 between $\omega_1$ and $\omega_2$. The value of $\omega_1$ has been arbitrarily selected as the point where $$\omega = \frac{mgl}{c}$$

For convenience, the transition from the first region to the second is shown in Fig. 3 as relatively abrupt change in slope; it will be understood that there is an intermediate range where the slope has a value between 0 and $-1$. The region III is the high frequency response of the damped pendulum. This occurs when the $p^2$ term becomes larger than either the $l$ or the $p$ term. This is indicated at $\omega_2$ which equals $$\frac{c}{1}$$

i. e.

$$\frac{\omega_0^2}{\omega_1}$$

It will be understood from an inspection of Equation 4 that in the three regions, the pendulum unit is acting respectively as an accelerometer, a velocity meter, and a deflection meter. In the low frequency range the output is proportional to the input acceleration $a$; in the middle frequency range the output is proportional to the input acceleration divided by $p$, that is, the integral of acceleration, and therefore velocity; in the high-frequency range, the output is proportional to the input acceleration $a$, divided by $p^2$, which is the double integral of acceleration, and therefore, deflection.

Equation 5 represents the performance function of the fedback, damped, forced pendulum. By comparing Equation 4 with Fig. 2 it can be seen that the effect of the feedback network 50 is to add the function $F_0$ to the denominator of the performance function, as below:

(5) $$\frac{e}{a} = \frac{S}{1 - \frac{\omega^2}{\omega_0^2} + j\frac{c}{mgl\omega} + F_0}$$

where $F_0$ is a linear function of the network function $F$. $F_0$ is related to $F$ by the relation $$F_0 = \frac{S_{TG}S_{SG}}{mgl}F$$

where $S_{TG}$ is the sensitivity of the torque generator 181 and $S_{SG}$ is the sensitivity of the signal generator 171. It can be seen from Equation 5 that the physical characteristics of the pendulum are effectively altered by adding various functions $F_0$. That is, if $F_0$ is made a constant (in which case the coupling network 50 is simply an amplifier), this is equivalent to adding to the $mgl$ term in Equation 3. In other words, the restoring force has been increased if $F$ is negative (decreased if $F$ is positive) just as if a horizontal spring had been added to the pendulous system. Similarly, if the function $F_0$ contains a differentiation, that is, making $F_0$ a term in $p$, then the damping of the pendulum is effectively altered. If $F_0$ contains a term in $p^2$, then the inertia of the system is effectively altered. It will now be shown how the performance function of Fig. 3 may be shaped by various functions $F_0$ derived from the coupling network 50.

Figure 4:
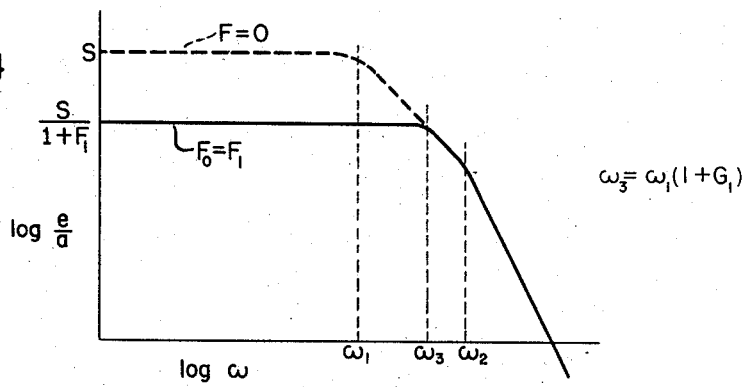

Fig. 4 shows the effect on the performance function of a simple amplification in the coupling network 50, that is $F_0$ is $F_1$ which is equal to the gain, $G_1$. In such a case, the frequency band of the first region is increased as shown in Fig. 4. The low frequency response is attenuated, but linear response is achieved over a wider range, extending to $\omega_3$. $\omega_3$ is the point at which the $p$ terms become commensurate with the terms which contain no $p$. Therefore, $\omega_3$ is $\omega_1 (1+F_1)$ or $\omega_1 (1+G_1)$.

Figure 5:
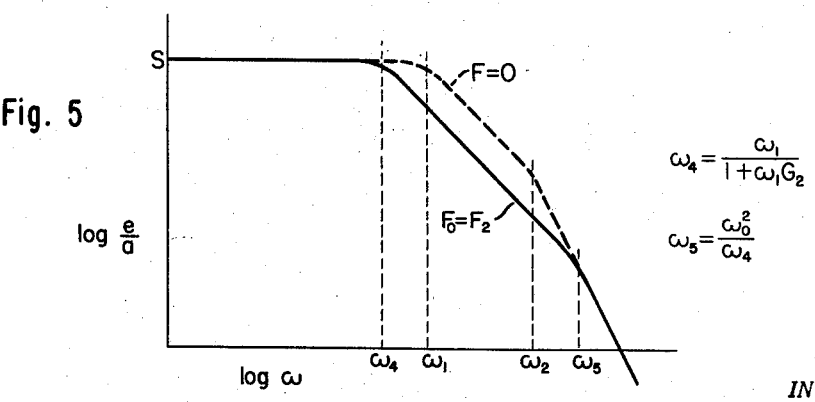

Fig. 5 shows the effect of a differentiation in the coupling network 50. The differentiation effectively adds to the damping constant $c$ of Equation 3. It therefore causes the second region where the performance function has a slope of $-1$, to be widened. This is the same as physically adding damping to the pendulum unit 150. This means that the low frequency at which the effective damping becomes noticeable is lowered and the high frequency at which the effective damping becomes negligible is made larger. Thus, the second region of the performance function is extended so that it lies between $\omega_4$ and $\omega_5$, as shown in Fig. 5. $\omega_4$ may be calculated as $$\frac{\omega_1}{1+\omega_1 G_2}; \omega_5 \text{ is } \frac{\omega_0^2}{\omega_4} \text{ or } \omega_2(1+\omega_1 G_2)$$

where the function $F_0$ associated with the coupling network 50 is $F_2$ and $F_2 = G_2 p$ where $p$ is the differential operator $$\frac{d}{dt}$$

and $G_2$ is the gain. In this range, the pendulum acts as a velocity meter.

Fig. 6 shows the effect of adding higher order differentiations. Two curves are shown. The first is for $F_0 = F_3$ and the second for $F_0 = F_4$. $F_3$ is made equal to $G_3 p^2$, thus effectively adding to the inertia of the pendulous element 161. This causes the frequency at which the effective inertia is felt ($\omega_2$) to be lowered to a value shown as $\omega_6$. $\omega_6$ may be calculated as $$\frac{\omega_2}{1+\omega_0^2 G_3}$$

$F_4$ is equal to $G_4 p^3$. The effect of such a term is to create a region in the curve in which the slope is $-3$; this represents an attenuation much greater than that that can be achieved by physical means. As shown in Fig. 6 this region has been located (by assigning a high value to $G_4$ for illustrative purposes) so that for practical purposes there are only two regions in the response characteristic, a linear response and then a rapid attenuation at $\omega_7$. Thus, a pendulum is achieved with characteristics such that it will measure accelerations up to a certain frequency, and be substantially unaffected by accelerations beyond that frequency. This is especially convenient in marine applications where it is desired to measure accelerations with a period substantially longer than a period of roll or pitch of the vessel. $\omega_7$ may be calculated as $$\frac{1}{\omega_4^2 G_4}$$

So far, it has been shown how the location of the critical points in the pendulum performance function may be altered by changing the characteristics of the coupling network 50. It will now be shown how the shape of the performance function may be altered by creating regions of positively slope in the low frequency area. This is done generally by introducing integration into the function F generated by the feedback network. This is shown in Fig. 7. The curve for $F_5$ shows an initial region in low frequency response where the slope of the performance function is +1. This is the result of making $$F_0 = F_5 = \frac{G_5}{p}$$

which creates a region where, when the frequency is very low, the term representing $F_5$ is considerably larger than any of the other terms (see Equation 5). This region ends where the $$\frac{1}{p}$$

term becomes commensurate with the 1 term, that is, at $\omega_8 = G_5$. Similarly, a double integration creates a low frequency response with a slope of +2, that is, a performance function which increases as the square of the frequency. This is shown in the curve for $F_6$. There the feedback function is $$\frac{G_6}{p^2}$$

so that at very low frequencies the response is $$\frac{Sp^2}{G_6}$$

This region ends at $\omega_9$ which is equal to $\sqrt{G_6}$. It should be noted that the curve for $F_5$ indicates that the output $e$ is proportional to the derivative of the input $a$.

It will be understood by those skilled in the art that the changes indicated in the performance function, are only as effective as the electrical components in the coupling network 50. Figs. 8 and 9 show suitable coupling networks 50 for differentiation and integration respectively. The transfer function of the R–C network in Fig. 8 is $$\frac{pR_1C}{R_1 + R_2 + pCR_1R_2}$$

so that at low frequencies the output $i$ approximates the differential of the input $e$ times a factor G, which is $$\frac{R_1C}{R_1 + R_2}$$

times the gain of the amplifier 50b. The transfer function of the R–C network in Fig. 9 is $$\frac{1}{1 + \frac{R_4}{R_3} + pR_4C_1}$$

so that at high frequencies, the output $i$ approximates the integral of the input $e$ times a factor G which is $$\frac{1}{R_4C_1}$$

times the gain of the amplifier 50b. In practice it is not possible to instrument a device which will act as a perfect differentiator at all frequencies, nor is it practical to build a perfect integrator. The errors in differentiation will occur generally at high frequencies, and the errors for integration at low frequencies. Hence the curves shown in Figs. 4 to 7 are theoretical curves which in general will not be achieved in practice. Thus, for example, in Fig. 6 the curves for $F_3$ and $F_4$ respectively, as the frequency becomes very high will become parallel to the curve for $F_0 = 0$. Also, in Fig. 7 as the frequency becomes almost zero, the curves for $F_5$ and $F_6$ will level off into a region of linear response parallel to the curve for $F_0 = 0$.

Nevertheless, it will be seen that the present invention provides a highly flexible method of altering the performance function of an acceleration-sensitive device. In most practical applications, the imperfections of a differentiator or an integrator will not affect the region of mechanical operation, which is presumably neither in the very high nor the very low electrical frequencies. The present invention provides a method and apparatus for changing the performance function of an acceleration sensitive-device without changing its physical characteristics. For example, it may be desirable to reduce the swing of a pendulum at low frequencies without disturbing its response characteristics as an accelerometer. In such a case the function F is a constant (which means simple amplification in the coupling network 50) and produces a characteristic like that shown in Fig. 4 for $F_0 = F_1$. Or one might wish to build a pendulum that has essentially a very long characteristic period and yet is small in physical size. Then, providing a double differentiation in the coupling network 50 produces an increase in the apparent inertia of the pendulous element, resulting in a response curve like that shown for $F_3$ in the Fig. 6. Or it might be desirable to reduce the sensitivity of a pendulum at high frequencies to prevent it from being affected by large short-period accelerations. In such a case, the curve indicated for $F_4$ in Fig. 6 would be satisfactory and is achieved by providing a third or higher order differentiation in the coupling network 50. It will, of course, be obvious that the coupling network is not confined to simple differentiation or integration, but may use any combination of the two so that the function F may contain terms of the first, second or higher order in combination.

Fig. 10 shows one form of the coupling network 50 utilizing a single stage of integration in combination with a single stage of differentiation. The input is first fed into a network 50c identical with that of Fig. 9, the output of which is then fed into a network similar to that shown at 50a in Fig. 8. Each of the separate networks is preferably provided with its own amplifier 50b.

It will also be understood that the present invention is not limited in scope to the pendulum arrangement shown, but may also be used with a spring-and-mass accelerometer, that is, a linear accelerometer instead of a rotating one. The undamped response curve for a spring-mass system is like that shown by the dotted curve in Fig. 3, and the effect of damping such a system produces a response curve like the full curve of Fig. 3. Forces may be applied to such a spring-mass arrangement by means of the linear force generator shown in U. S. Patent No. 2,488,734 to Mueller issued November 22, 1949, and deflections of the mass may be read out by a linear signal generator, such as the one shown in the above-mentioned Mueller patent. Thus, in its most general sense, the present invention provides means for changing the performance function of an accelerometer which contains an inertial element and means for resisting deflections of the inertial element by a force proportional to the amount of deflection. The present invention provides means for detecting the amounts of such deflection and generating a signal proportional thereto, means for generating a specified function of said output signal, and means for imposing a force representing said function on the inertial element of the accelerometer.

Having thus described our invention, we claim:

1. Measuring apparatus comprising a mass element, means for mounting the mass element for deflections thereof in a single degree of freedom, viscous damping means for the mass element, a signal generator to generate an electrical signal dependent on the deflection of the mass element from a neutral position, a force generator responsive to an electrical input to apply a force to the mass element, and a feedback circuit connected from the signal generator to the input of the force generator to energize the force generator in a direction to reduce the deflection of the mass element, said feedback circuit including an amplifier and an integrating network.

2. Measuring apparatus comprising a single-degree-of-freedom pendulum, a shaft for mounting the pendulum for angular deflections, viscous damping means for the pendulum, a signal generator to generate an electrical signal dependent on the pendulum deflection from the vertical, a torque generator on the shaft responsive to an electrical input, and a feedback circuit connected from the signal generator to the input of the torque generator to energize the torque generator in a direction to reduce the deflection of the pendulum, said feedback circuit including an amplifier and an integrating network.

3. Measuring apparatus comprising a single-degree-of-freedom pendulum, a shaft for mounting the pendulum for angular deflections, a float case in which the pendulum is contained, an outer case, a liquid buoying medium between the cases, said buoying medium acting to apply viscous damping to the pendulum, a signal generator to generate an electrical signal dependent on the pendulum deflection from the vertical, a torque generator on the shaft responsive to an electrical input, and a feedback circuit connected from the signal generator to the input of the torque generator to energize the torque generator in a direction to reduce the deflection of the pendulum, said feedback circuit including an amplifier and an integrating network.

4. Measuring apparatus comprising a mass element, means for mounting the mass element for deflections thereof in a single degree of freedom, viscous damping means for the mass element, a signal generator to generate an electrical signal dependent on the deflection of the mass element from a neutral position, a force generator responsive to an electrical input to apply a force to the mass element, and a feedback circuit connected from the signal generator to the input of the force generator to energize the force generator in a direction to reduce the deflection of the mass element, said feedback circuit including an amplifier and an integrating and a differentiating network.

5. Measuring apparatus comprising a single-degree-of-freedom pendulum, a shaft for mounting the pendulum for angular deflections, viscous damping means for the pendulum, a signal generator to generate an electrical signal dependent on the pendulum deflection from the vertical, a torque generator on the shaft responsive to an electrical input, and a feedback circuit connected from the signal generator to the input of the torque generator to energize the torque generator in a direction to reduce the deflection of the pendulum, said feedback circuit including an amplifier and an integrating and a differentiating network.

6. Measuring apparatus comprising a single-degree-of-freedom pendulum, a shaft for mounting the pendulum for angular deflections, a float case in which the pendulum is contained, an outer case, a liquid buoying medium between the cases, said buoying medium acting to apply viscous damping to the pendulum, a signal generator to generate an electrical signal dependent on the pendulum deflection from the vertical, a torque generator on the shaft responsive to an electrical input, and a feedback circuit connected from the signal generator to the input of the torque generator to energize the torque generator in a direction to reduce the deflection of the pendulum, said feedback circuit including an amplifier and an integrating and a differentiating network.

References Cited in the file of this patent

UNITED STATES PATENTS

| | | |
|---|---|---|
| 2,402,012 | Bennett | June 11, 1946 |
| 2,552,722 | King | May 15, 1951 |
| 2,584,222 | O'Connor | Feb. 5, 1952 |
| 2,591,921 | Cosgriff et al. | Apr. 8, 1952 |
| 2,598,672 | Braddon et al. | June 3, 1952 |
| 2,634,610 | Silverman | Apr. 14, 1953 |
| 2,726,074 | Ketchledge | Dec. 6, 1955 |